(12) United States Patent
Casenave et al.

(10) Patent No.: US 10,465,998 B2
(45) Date of Patent: Nov. 5, 2019

(54) HEAT EXCHANGER COATING

(71) Applicant: Valeo Systemes Thermiques, Le Mesnil Saint Denis (FR)

(72) Inventors: Christian Casenave, La Suze-sur-Sarthe (FR); François Busson, Saint-Gervais-en-Belin (FR); Maryse Philippe, La Suze-sur-Sarthe (FR); Jean-Christophe Prevost, Ligron (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 384 days.

(21) Appl. No.: 15/037,458

(22) PCT Filed: Oct. 29, 2014

(86) PCT No.: PCT/EP2014/073189
§ 371 (c)(1),
(2) Date: Sep. 9, 2016

(87) PCT Pub. No.: WO2015/074844
PCT Pub. Date: May 28, 2015

(65) Prior Publication Data
US 2016/0370132 A1  Dec. 22, 2016

(30) Foreign Application Priority Data

Nov. 20, 2013 (FR) ..................... 13 61392

(51) Int. Cl.
*F28F 19/06* (2006.01)
*F28F 19/02* (2006.01)
(Continued)

(52) U.S. Cl.
CPC ........... *F28F 19/06* (2013.01); *B60H 1/3227* (2013.01); *B60H 3/0092* (2013.01); *C09D 5/00* (2013.01);
(Continued)

(58) Field of Classification Search
CPC .. F28F 19/06; F28F 19/02; F28F 19/04; F28F 21/084; F28F 2245/02; B60H 1/3227;
(Continued)

(56) References Cited

U.S. PATENT DOCUMENTS 3,917,648 A * 11/1975 McLeod ................ C08G 77/48
524/364
3,932,339 A * 1/1976 McLeod ................ C08G 77/48
524/783
(Continued)

FOREIGN PATENT DOCUMENTS

EP  2045559 A1  4/2009
WO  2003038471 A1  5/2003
WO  2009113461 A1  9/2009

OTHER PUBLICATIONS

Arthur, David Ebuka, et al., "A review on the assessment of polymeric materials used as corrosion inhibitor of metals and alloys", International Journal of Industrial Chemistry (IJIC) [online], Apr. 2013 [retrieved on Jun. 18, 2019]. Retrieved from the Internet.*
(Continued)

*Primary Examiner* — Ljiljana V. Ciric
(74) *Attorney, Agent, or Firm* — Osha Liang LLP

(57) ABSTRACT

A heat exchanger for an air-conditioning circuit of a vehicle. The heat exchanger enables heat exchange between fluids and has a surface in contact with one of the fluids. The surface is formed from aluminum and/or from aluminum alloy. The surface is coated with an alumina layer and a reinforcing layer. The reinforcing layer includes an organic substance and a mineral substance. The organic substance includes at least one polymer and the mineral substance is capable of reacting with the aluminum in order to form an anticorrosion material.

13 Claims, 1 Drawing Sheet

(51) Int. Cl.

| | | |
|---|---|---|
| F28F 21/08 | (2006.01) | |
| B60H 1/32 | (2006.01) | |
| B60H 3/00 | (2006.01) | |
| C09D 5/00 | (2006.01) | |
| C09D 5/08 | (2006.01) | |
| C09D 5/14 | (2006.01) | |
| F25B 39/00 | (2006.01) | |
| F25B 47/00 | (2006.01) | |
| F28F 19/04 | (2006.01) | |
| C09D 7/61 | (2018.01) | |
| C09D 7/65 | (2018.01) | |
| F25B 39/02 | (2006.01) | |
| C08K 3/22 | (2006.01) | |

(52) U.S. Cl.
CPC ............... *C09D 5/08* (2013.01); *C09D 5/082* (2013.01); *C09D 5/14* (2013.01); *C09D 7/61* (2018.01); *C09D 7/65* (2018.01); *F25B 39/00* (2013.01); *F25B 47/003* (2013.01); *F28F 19/02* (2013.01); *F28F 19/04* (2013.01); *F28F 21/084* (2013.01); *C08K 2003/2227* (2013.01); *F25B 39/02* (2013.01); *F28F 2245/02* (2013.01)

(58) Field of Classification Search
CPC .......... B60H 3/0092; C09D 7/65; C09D 7/61; C09D 5/082; C09D 5/08; C09D 5/14; C09D 5/00; F25B 47/003; F25B 39/00; F25B 39/02; C08K 2003/2227
See application file for complete search history.

(56) References Cited

U.S. PATENT DOCUMENTS

| | | | | |
|---|---|---|---|---|
| 3,997,501 | A * | 12/1976 | McLeod | C08G 77/48 524/100 |
| 5,440,446 | A * | 8/1995 | Shaw | B05D 1/60 361/272 |
| 5,516,595 | A * | 5/1996 | Newkirk | C04B 35/652 428/307.7 |
| 5,962,103 | A * | 10/1999 | Luthra | C04B 35/573 428/107 |
| 6,254,938 | B1 * | 7/2001 | Pranevicius | C23C 4/06 427/452 |
| 6,867,318 | B1 * | 3/2005 | Cui | C07F 7/1804 556/423 |
| 8,017,227 | B2 * | 9/2011 | Soroushian | H01B 1/122 428/209 |
| 2002/0009622 | A1 * | 1/2002 | Goodson | B32B 13/00 428/703 |
| 2003/0080677 | A1 * | 5/2003 | Mikhael | C23C 14/12 313/504 |
| 2003/0185990 | A1 * | 10/2003 | Bittner | B05D 7/16 427/385.5 |
| 2003/0203991 | A1 * | 10/2003 | Schottman | C08K 3/22 523/334 |
| 2004/0020568 | A1 * | 2/2004 | Phelps | C23C 22/34 148/273 |
| 2004/0062873 | A1 * | 4/2004 | Jung | C09D 7/67 427/407.1 |
| 2006/0134415 | A1 * | 6/2006 | Gogotsi | C04B 35/6229 428/375 |
| 2006/0222423 | A1 * | 10/2006 | Dejong | F28D 15/046 399/333 |
| 2008/0145631 | A1 * | 6/2008 | Bhate | B08B 17/06 428/220 |
| 2008/0283228 | A1 | 11/2008 | Ohwaki et al. | |
| 2009/0061184 | A1 * | 3/2009 | Jaworowski | C23C 18/10 428/212 |
| 2009/0238811 | A1 * | 9/2009 | McDaniel | A61L 2/00 424/94.2 |
| 2010/0233146 | A1 * | 9/2010 | McDaniel | A01N 63/02 424/94.2 |
| 2011/0070376 | A1 * | 3/2011 | Wales | A01N 63/00 427/414 |
| 2011/0240064 | A1 * | 10/2011 | Wales | C09D 5/14 134/26 |
| 2011/0250626 | A1 * | 10/2011 | Williams | A01N 63/02 435/18 |
| 2011/0262699 | A1 * | 10/2011 | Yializis | B32B 15/08 428/138 |
| 2012/0097194 | A1 * | 4/2012 | McDaniel | A01N 63/02 134/26 |
| 2014/0083324 | A1 * | 3/2014 | Wales | A01N 63/00 106/18.32 |
| 2014/0193889 | A1 * | 7/2014 | McDaniel | A61L 2/00 435/264 |
| 2014/0196631 | A1 * | 7/2014 | McDaniel | A01N 63/02 106/124.1 |
| 2015/0210951 | A1 * | 7/2015 | Aizenberg | B08B 17/06 508/107 |
| 2016/0370132 | A1 * | 12/2016 | Cazenave | C09D 5/38 |

OTHER PUBLICATIONS

Chandler, David L., "Self-Healing Aluminum Oxide Protects Against Corrosion", SciTechDaily [online], Apr. 2018 [retrieved on Jun. 18, 2019]. Retrieved from the Internet.*
International Search Report issued in PCT/EP2014/073189 dated Jan. 22, 2015 (4 pages).
Written Opinion of the International Searching Authority issued in PCT/EP2014/073189 dated Jan. 22, 2015 (6 pages).

* cited by examiner

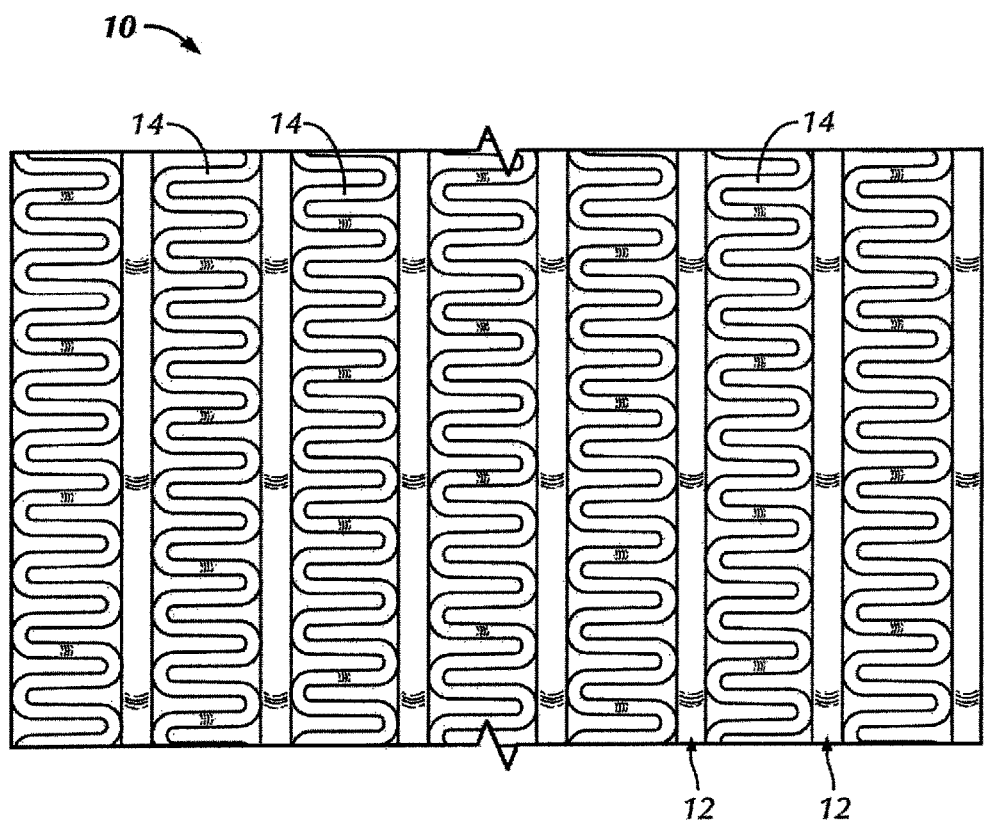

HEAT EXCHANGER COATING

The present invention relates to a heat exchanger, especially for an air-conditioning fluid circuit of a vehicle, and more particularly to an evaporator, and also to a process for manufacturing such an exchanger.

In the air-conditioning systems of vehicles, an evaporator is swept by a flow of air to be cooled. Due to the low temperature of the surfaces of the evaporator exposed to the air flow, the moisture contained in the latter tends to be deposited on these surfaces. The water thus deposited reduces the flow area of the air and prevents direct contact between the latter and the metal surfaces of the evaporator, which is detrimental to the heat exchange capacity. Furthermore, soiling adheres to the wet surfaces, promoting microbial proliferation and the production of unpleasant odors. The presence of drops of water also causes a corrosion of the surfaces of the exchanger leading to the degradation thereof and the embrittlement thereof.

In order to overcome these drawbacks, coatings are known that contain substances intended to form, after drying, on the surfaces of the evaporator, an adherent layer that has hydrophilic, antimicrobial and anticorrosive properties. These coatings are generally deposited in several steps, in particular a prior step of surface conversion intended to enable a good attachment of said layer.

Also known, especially from EP 2 045 559 and WO 2003/0038471, are treatment liquids for covering such surfaces that are deposited in a single step directly after the brazing step. On the other hand, these liquids form, after drying, on said surfaces, an adherent layer that has only film-forming, hydrophilic and antimicrobial properties without real anticorrosive properties.

In order to overcome these drawbacks, there is a need for a coating for the surfaces of an evaporator that are intended to come into contact with a medium to be cooled which has anticorrosive properties, even hydrophilic and antimicrobial properties, and which is deposited in a single step.

For this purpose, the invention relates to a heat exchanger, in particular an evaporator for an air-conditioning circuit of a vehicle, said exchanger enabling a heat exchange between a first fluid and a second fluid and having surfaces intended to come into contact with one of said fluids, said surfaces being formed from aluminum and/or from aluminum alloy and coated with an alumina layer and with a layer referred to as a reinforcing layer that reinforces the natural protection of the aluminum, said reinforcing layer comprising a portion of organic substances and a portion of mineral substances, said portion of organic substances comprising at least one polymer and said portion of mineral substances comprising at least one substance capable of reacting with the aluminum in order to form an anticorrosion material.

In other words, the exchangers are firstly protected by their natural alumina layer. The coating applied thereto additionally makes it possible to re-establish protection when the surfaces of the exchanger are subjected to attacks and especially corrosion pitting, by reacting with the aluminum of the surfaces with which it is then brought into contact. Furthermore, without alleging to be a precise application for the phenomena in question, the polymer material(s) used contribute to the stabilization of the coating on the surfaces, despite the absence of pretreatment. Said reinforcing coating or layer makes it possible to reinforce the natural protection of the aluminum, especially by regenerating the alumina layer. This coating makes it possible to improve the resistance of the exchanger to corrosion.

According to various embodiments of the invention, which could be taken together or separately:
said alumina layer is itself coated with said reinforcing layer,
said reinforcing layer is coated without prior preparation of the surface, of activation or pickling type,
said substance(s) capable of reacting with the aluminum make it possible to fill in surface irregularities of said surfaces and/or of the alumina layer thereof,
said substance(s) capable of reacting with the aluminum are at least one chromium-based substance,
said chromium-based substance(s) may be trivalent chromium salts,
said portion of organic substances and/or said portion of mineral substances provide said reinforcing layer with hydrophilic properties and/or antimicrobial properties,
said polymer of the portion of organic substances comprises a polymer containing free hydroxyl functions, such as polyvinyl alcohol,
said portion of organic substances comprises a binder,
said binder is of organic acid, alcohol or amine type and may react with the hydroxyl functions of said polymer,
said portion of organic substances is between 50% and 80%, preferably between 55% and 65%, by weight,
said portion of mineral substances is between 20% and 50%, preferably between 35% and 45%, by weight,
said reinforcing layer additionally comprises at least one corrosion inhibitor,
said corrosion inhibitor(s) reform the alumina layer in the event of attack,
said corrosion inhibitor(s) are at least one titanium-based substance,
said titanium-based substance(s) are titanium salts,
said reinforcing layer comprises at least one antimicrobial substance,
said antimicrobial substances may be organic substances such as bronopol, carbendazim, isothiazolinone and/or at least one zinc-based substance, such as zinc pyrithione,
said reinforcing layer has a surface density of between 0.5 and 1.5 $g/m^2$, preferably of between 0.8 and 1.2 $g/m^2$,
said exchanger comprises one face, the surface of which is covered with a reinforcing layer having a thickness greater than that covering the opposite face,
said face covered with a greater thickness is the face exposed to the external air flow.

The invention also relates to a process for manufacturing an exchanger, in particular an evaporator for an air-conditioning circuit of a vehicle, process wherein said exchanger is formed with surfaces intended to come into contact with one of the fluids to be cooled, said surfaces being formed from aluminum and/or from aluminum alloy and coated with an alumina layer, and said alumina layer is covered with a coating that reinforces the natural protection of the aluminum, said coating comprising a portion of organic substances and a portion of mineral substances, said portion of organic substances comprising at least one polymer and said portion of mineral substances comprising at least one substance capable of reacting with the aluminum in order to form an anticorrosion material.

In other words, according to the process of the invention, the coating may be applied directly on the surfaces of the exchanger without a prior surface treatment and/or preparation step. In yet other words, a single application of coating makes it possible to provide the surfaces of the exchanger with protection against corrosion.

According to various embodiments of the invention, which could be taken together or separately:

- said surfaces are covered after a step of brazing the exchanger,
- said coating is applied to said surfaces by spraying and/or blowing,
- the exchanger, after having covered its surface with coating, is blown, before drying, so as to adjust the thickness of coating present on two of the opposite faces of the exchanger,
- said coating is dried,
- said coating is dried during a step of heating between 130° C. and 180° C., preferably at 150° C.,
- said heating step lasts from 1 to 10 min; preferably it lasts 5 min,
- said coating is applied so that the amount of coating applied to the outer surface of said exchanger is between 15 and 20 ml/m$^2$,
- the pH of said coating is chosen from between 1.5 and 5, preferably between 2 and 3.5,
- said coating comprises a reduced portion of fluoride, of less than 1000 ppm.

The invention will be better understood, and other objectives, details, characteristics and advantages thereof will become more clearly apparent, in the course of the detailed explanatory description which follows, of at least one embodiment of the invention given by way of purely illustrative and nonlimiting example, with reference to the appended FIG. 1 which is a view of a portion of a heat exchanger according to the invention.

FIG. 1 represents, in a general manner, a portion of a heat exchanger enabling a heat exchange between a first fluid and a second fluid. It may be, for example, an evaporator for a vehicle air-conditioning circuit. In this case, one of the two fluids is a flow of air to be cooled and/or the other fluid a refrigerant. In particular, it is in this example a brazed evaporator made of aluminum or of aluminum alloy.

Said exchanger is formed here of a bundle 10 comprising ducts 12 for circulation of the refrigerant. Said ducts 12 are formed, for example, of tubes, connected to one or some collectors, and/or of pairs of stacked plates, communicating with one another. Between the tubes and/or pairs of plates, it is possible to provide disrupters 14, especially separators of serpentine shape. These separators 14 disrupt the circulation of the air flow and increase the exchange area. The heat exchange between the air flow and the refrigerant is thus improved. These separators 14 are in contact with the tubes and/or the pairs of plates, especially via the apices of their bends.

Said exchanger has surfaces intended to come into contact with one of said fluids, especially the flow of air to be cooled, in particular the walls of said tubes, pairs of plates and/or separators.

According to the invention, said surfaces are formed from aluminum and/or from aluminum alloy. They are coated with an alumina layer and with a layer referred to as a reinforcing layer that reinforces the natural protection of the aluminum. This reinforcing layer comprises a portion of organic substances comprising at least one polymer and a portion of mineral substances comprising at least one substance capable of reacting with the aluminum in order to form an anticorrosion material. Said reinforcing layer advantageously constitutes a coating of said alumina layer.

The presence of the mineral substances capable of reacting with the aluminum makes it possible to compensate for attacks on the alumina layer, or even to regenerate said alumina layer. A protective layer is thus reformed and the consequences of corrosion attacks of the surfaces of the exchanger are limited. By reacting with the aluminum, said substances could also make it possible to fill in surface irregularities of said surfaces and/or of the alumina layer thereof.

The organic substances and/or the mineral substances in the coating could additionally provide the surfaces of the exchanger with hydrophilic and/or antimicrobial properties. Thus, the drops of water flatten out in the form of a film which is easier to drain and avoids the spraying of water caused by the removal of drops of water.

Said substances are advantageously substances known for fixing oxygen molecules. Said substances are preferably chromium-based substances, in particular trivalent chromium salts.

This mechanism may be improved by being in an acid medium, especially at a pH of between 1.5 and 5, preferably between 2 and 3.5. This pH may be obtained by the addition of acids, in particular organic acids that could furthermore be binders capable of reacting with the polymer(s) of the portion of organic substances. Said polymer comprises, for example, a hydroxylated polymer of vinyl alcohol type. The mechanism is also improved if the coating comprises a small portion of fluoride, of less than 1000 ppm.

The anticorrosion properties provided by the substances capable of reacting with the aluminum may be reinforced by the addition of one or more corrosion inhibitors to said reinforcing layer. These may be titanium-based substances, especially titanium salts. These corrosion inhibitors may be substances that fix oxygen.

Likewise, for improving the antimicrobial properties, said reinforcing layer may comprise one or more antimicrobial substances. These substances may be selected from bronopol, carbendazim, isothiazolinone and zinc-based substances, such as zinc pyrithione. In the case of a coating having a pH between 1.5 and 5, the antimicrobial substance(s) must withstand the acid media.

Such a heat exchanger may be obtained, for example, by the process of the invention.

In a first step, said exchanger is formed with surfaces that are intended to come into contact with one of the fluids to be cooled and said surfaces are formed from aluminum and/or from aluminum alloy and coated with an alumina layer. Preferably, the exchanger is obtained by a brazing step.

In a second step, said alumina layer is covered with a coating that reinforces the natural protection of the aluminum. Said coating comprises a portion of organic substances comprising at least one polymer and a portion of mineral substances comprising at least one substance capable of reacting with the aluminum in order to form an anticorrosion material. According to the invention, the coating is applied directly after the brazing step without an additional step, such as a surface treatment of activation or pickling type, or the preparation for a conventional immersion process—closing off the internal circuit, inserting into equipment for immersion in a bath.

This step makes it possible to form a layer that regenerates and/or that reinforces the natural protection of the aluminum, advantageously by regenerating the alumina layer.

As described above, the pH of the coating is preferably between 1.5 and 5 and in an optimized manner between 2 and 3.5 in order to obtain a good regeneration of the alumina layer and a good protection of the surfaces of the exchanger by the reinforcing layer.

The coating is generally applied to the exchanger in a uniform manner, for example by spraying and/or by blowing. Preferably, the amount applied is between 15 and 20 ml/m$^2$.

The covering step may be followed by a step in which the exchanger is blown. This step makes it possible to adjust the thickness of coating present on two of the opposite faces of the exchanger. Generally, the thickness of the coating on the face opposite the spraying and blowing is slightly greater. Preferably, this face is the face exposed to the air flow since this overthickness leads to the corrosion resistance of the exchanger being improved. Advantageously, this step takes place before the drying step.

These steps are followed by a step in which the coating is dried. This drying step especially enables the formation of the reinforcing layer. Indeed, this step enables the polymerization of the polymer(s) present in the portion of organic substances of the coating. The polymerization may be reinforced by the crosslinking of the polymers, in particular if crosslinking agents are added to the coating. The crosslinking agents may be of organic acid, epoxy or acrylic type, selected to react with the free hydroxyl functions of the polymer.

The drying and the polymerization may also be reinforced in an advantageous manner if said coating is dried during a step of heating between 130° C. and 180° C., preferably at 150° C. Said heating step lasts from 1 to 10 min; preferably it lasts 5 min.

An example of a reinforcing layer that has made it possible to obtain an exchanger having satisfactory hydrophilic, antibacterial and anticorrosion qualities comprises 60% of organic substances and 40% of mineral substances, including 30% of chromium-based substances. The polymer included in the portion of organic substances is especially a vinyl alcohol polymer. This layer has a surface density of between 0.8 and 1.2 g/m$^2$ and an overthickness of 20% on the face exposed to the air flow obtained for example by the blowing step described above.

Comparative tests were carried out between such an exchanger and an exchanger from the prior art.

It was thus shown that such an exchanger had equivalent results regarding its hydrophilic, antimicrobial and anti-odor qualities, relative to an exchanger from the prior art known for these same qualities.

In addition, the corrosion resistance is considerably improved owing to the presence of the reinforcing layer. Corrosion tests made it possible to demonstrate that:
- the signs of corrosion attack of the aluminum surface were retarded by more than 60 days on an exchanger according to the invention;
- the depth of the corrosion pitting on the surface of an exchanger according to the invention was stable after 90 days in contact with a corrosive solution in a corrosion chamber, whereas the depth of the corrosion pitting on the surface of an exchanger from the prior art was increased;
- the failure of the exchanger according to the invention is obtained around 50 days after that of the exchanger from the prior art.

It should be noted that embodiment variants are of course possible and that the present invention is not limited to an evaporator for vehicle air conditioning. In particular, it is possible to extend the present invention to other types of heat exchanger, and to other fields.

The invention claimed is:

1. A heat exchanger for an air-conditioning circuit of a vehicle, said heat exchanger enabling heat exchange between a first fluid and a second fluid and comprising:
   a surface in contact with at least one of said first fluid and said second fluid, said surface being formed from at least one material selected from the group consisting of aluminum and aluminum alloy,
   wherein said surface is coated with an alumina layer and a reinforcing layer,
   wherein said reinforcing layer comprises:
      an organic substance including at least one polymer; and
      a mineral substance capable of reacting with the aluminum to form an anticorrosion material and
   wherein said mineral substance capable of reacting with the aluminum allows for regeneration of the alumina layer coated on said surface.

2. The heat exchanger as claimed in claim 1, wherein said mineral substance capable of reacting with the aluminum allows for filling in surface irregularities of at least one selected from the group consisting of the surface and the alumina layer.

3. The heat exchanger as claimed in claim 1, wherein said mineral substance capable of reacting with the aluminum comprises from at least one material selected from the group consisting of a chromium-based substance and a fluoride-based substance.

4. The heat exchanger as claimed in claim 1, wherein from at least one material selected from the group consisting of said organic substance and said mineral substance provide said reinforcing layer with from at least one property selected from the group consisting of hydrophilic properties and antimicrobial properties.

5. The exchanger as claimed in claim 4, wherein said organic substance occupies between 50% and 80% of said reinforcing layer.

6. The exchanger as claimed in claim 5, wherein said mineral substance occupies between 20% and 50% of said reinforcing layer.

7. The heat exchanger as claimed in claim 1, wherein said reinforcing layer additionally comprises at least one corrosion inhibitor.

8. The heat exchanger as claimed in claim 1, wherein said reinforcing layer additionally comprises at least one antimicrobial substance.

9. The heat exchanger as claimed in claim 1, wherein said reinforcing layer weighs between 0.5 and 1.5 g per 1 m$^2$ of said surface.

10. The heat exchanger as claimed in claim 1, wherein said heat exchanger comprises one face having a first surface and a second surface opposite to the first surface, a first portion of said reinforcing layer covering the first surface having a thickness greater than the thickness of a second portion of said reinforcing layer covering the second surface.

11. The heat exchanger as claimed in claim 1, wherein the heat exchanger is an evaporator.

12. A heat exchanger for an air-conditioning circuit of a vehicle, said heat exchanger enabling heat exchange between a first fluid and a second fluid and comprising:
   a first surface in contact with said first fluid and being formed from at least one material selected from the group consisting of aluminum and-aluminum alloy; and
   a second surface in contact with said second fluid and being formed from at least one material selected from the group consisting of aluminum and-aluminum alloy, wherein said first surface and said second surface are opposite surfaces of a face in the heat exchanger and are coated with an alumina layer and a reinforcing layer, wherein said reinforcing layer comprises a mineral substance capable of regenerating said alumina layer, and wherein a first portion of said reinforcing layer covering the first surface has a thickness greater than the thickness of a second portion of said reinforcing layer covering the second surface.

13. A heat exchanger for an air-conditioning circuit of a vehicle, said heat exchanger enabling heat exchange between a refrigerant and an external air flow and comprising:

a first surface in contact with said external air flow and being formed from at least one material selected from the group consisting of aluminum and-aluminum alloy; and a second surface in contact with said refrigerant and being formed from at least one material selected from the group consisting of aluminum and-aluminum alloy, wherein said first surface and said second surface are coated with an alumina layer and a reinforcing layer, wherein said reinforcing layer comprises a mineral substance capable of regenerating said alumina layer, and wherein a first portion of said reinforcing layer covering the first surface in contact with said external air flow has a thickness greater than the thickness of a second portion of said reinforcing layer covering the second surface in contact with said refrigerant.

* * * * *